(12) United States Patent
Matoba et al.

(10) Patent No.: US 6,324,655 B1
(45) Date of Patent: *Nov. 27, 2001

(54) INPUT/OUTPUT CONTROLLER PROVIDING PREVENTIVE MAINTENANCE INFORMATION REGARDING A SPARE I/O UNIT

(75) Inventors: Tatsuo Matoba; Keiichi Yorimitsu, both of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/034,010

(22) Filed: Mar. 2, 1998

Related U.S. Application Data

(62) Division of application No. 08/530,724, filed on Sep. 15, 1995, now Pat. No. 5,826,003, which is a division of application No. 08/373,475, filed on Jan. 17, 1995, now Pat. No. 5,491,816, which is a continuation of application No. 07/857,931, filed on May 19, 1992, now abandoned.

(30) Foreign Application Priority Data

Sep. 20, 1990 (JP) ......................................... 2-25103
Sep. 20, 1991 (WO) .................................. PCT/JP91/01247

(51) Int. Cl.[7] ........................... H02H 3/05; H03K 19/003

(52) U.S. Cl. ................................. 714/7; 714/710

(58) Field of Search ............................... 714/7, 6, 2, 710, 714/711, 42, 165

(56) References Cited

U.S. PATENT DOCUMENTS

| 4,092,732 | 5/1978 | Ouchi ....................................... 714/5 |
| 4,862,411 | 8/1989 | Dishon et al. ........................ 711/167 |
| 4,942,579 | 7/1990 | Goodlander et al. ................. 714/805 |

(List continued on next page.)

FOREIGN PATENT DOCUMENTS

| 89-00313 | 1/1989 | (EP) . |
| 0 320 107 | 6/1989 | (EP) . |

(List continued on next page.)

OTHER PUBLICATIONS

T. Oyama, et al., Fujitsu Scientic & Technical Journal, Feb. 1991, vol. 26, No.4, pp. 291–295.
European Patent Office Communication Dated May 15, 1998 for European Application No. 97 200 322.2.
Patent Abstracts of Japan, vol. 13, No. 98 (P–840) Aug. 3, 1989 & JP–A–63 279 318 (NEC Corp.) *abstract*.

(List continued on next page.)

Primary Examiner—Dieu-Minh Le
(74) Attorney, Agent, or Firm—Staas & Halsey LLP

(57) ABSTRACT

A I/O controller which is connected to a plurality of I/O units and one spare I/O unit, controls a plurality of I/O units based on a command from a master unit, and allows a spare I/O unit to be used in place of an I/O unit where an abnormality is found, when an abnormality is found in any of a plurality of I/O units. This I/O controller gives a decision about normality at a time interval not in use for an operation when no command from a master unit (10) is being processed, after selecting I/O units (30) or a spare I/O unit (31). When it gives a decision of abnormality, the controller stores information about the abnormality in preventive maintenance information storage register (25) as preventive maintenance information.

70 Claims, 6 Drawing Sheets

U.S. PATENT DOCUMENTS

| | | | |
|---|---|---|---|
| 4,989,205 | | 1/1991 | Dunphy, Jr. et al. .................... 714/6 |
| 5,043,940 | * | 8/1991 | Harari ............................. 365/185.03 |
| 5,051,887 | | 9/1991 | Berger ................................. 711/162 |
| 5,077,736 | | 12/1991 | Dunphy, Jr. et al. .................... 714/7 |
| 5,123,016 | * | 6/1992 | Muller et al. ........................ 714/711 |
| 5,124,987 | | 6/1992 | Milligan et al. ......................... 714/7 |
| 5,134,616 | * | 7/1992 | Barth, Jr. et al. .................... 714/711 |
| 5,210,860 | | 5/1993 | Pfeffer .................................. 714/42 |
| 5,210,866 | | 5/1993 | Milligan et al. ......................... 714/6 |
| 5,235,687 | | 8/1993 | Bacot et al. ......................... 711/165 |
| 5,274,645 | | 12/1993 | Idleman et al. .......................... 714/6 |
| 5,313,585 | * | 5/1994 | Jeffries et al. ...................... 711/201 |
| 5,313,626 | * | 5/1994 | Jones et al. ............................. 714/5 |
| 5,535,328 | * | 7/1996 | Harari et al. ............................ 714/7 |

FOREIGN PATENT DOCUMENTS

| | | |
|---|---|---|
| 56-72359 | 6/1981 | (JP) . |
| 60-5023 | 2/1985 | (JP) . |
| 60-211536 | 10/1985 | (JP) . |
| 62-90068 | 4/1987 | (JP) . |
| 62-212856 | 9/1987 | (JP) . |
| 63-279318 | 11/1988 | (JP) . |
| 2-64835 | 3/1990 | (JP) . |
| 2-93953 | 4/1990 | (JP) . |

OTHER PUBLICATIONS

English–language Search Report citing U.S. Patent No. 4,862,411; U.S. Patent No. 4,942,579; U.S. Patent No. 4,092,732; JP 89–00313.

Office Action for a divisional application of basic Japanese Patent Application No. 2–251053 filed Sep. 20, 1990.

Yuji Ogawa et al., "F6401A Magnetic Disk Array Unit", Fujitsu Scientific and Technology Journal, 31, 1, pp. 18–28 (Jun. 1995).

Hitoshi Matsushima et al., "F1710A File Control Unit and F6493 Array Disk Subsystem", Fujitsu Scientific and Technical Journal, vol. 31, No. 1, pp. 29–35 (Jun. 1995).

The RAID Advisory Board, "The RAIDBook, A Source Book for RAID Technology", Edition 1–1, Nov. 18, 1993.

* cited by examiner

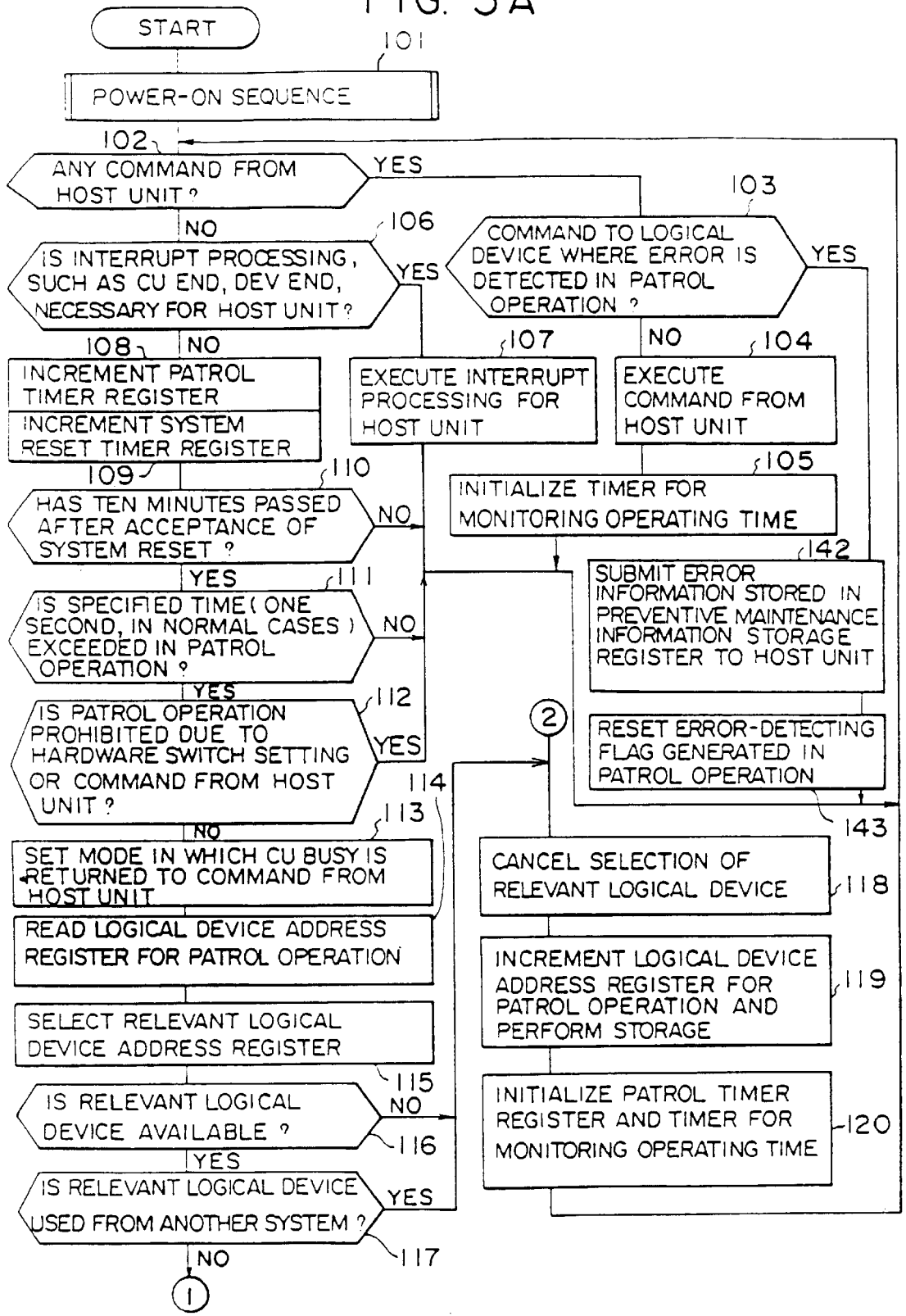

INPUT/OUTPUT CONTROLLER PROVIDING PREVENTIVE MAINTENANCE INFORMATION REGARDING A SPARE I/O UNIT

This is a Divisional Application of prior U.S. application Ser. No. 08/530,724, now allowed U.S. Pat. No. 5,826,003, which is a divisional application of prior U.S. application Ser. No. 08/373,475 filed Jan. 17, 1995, now U.S. Pat. No. 5,491,816, which is a File Wrapper Continuation Application of original U.S. application Ser. No. 07/857,931, now abandoned.

FIELD OF THE INVENTION

The present invention relates to an I/O controller that controls an I/O unit based on a command from a host unit, and more particularly to an I/O controller that supplies, to a host unit, preventive maintenance information about a spare I/O unit, which is used in place of an I/O unit in which an abnormality occurs, when any abnormality occurs in an I/O unit.

Recently, the demand for high reliability in a computer system has accompanied the demand for high reliability in an I/O subsystem. This has led to the practice of providing an I/O subsystem with a spare I/O unit. In such an I/O subsystem, the spare I/O unit is not used during normal operation. It is used only when any abnormality including a read error or a hardware failure occurs elsewhere in a current I/O unit.

Consequently, it is required to provide an I/O subsystem with a means of monitoring normality /abnormality of a spare I/O unit and of supplying such preventive maintenance information as regarding a hard error or a read error, to a host unit, in order for a spare I/O unit to carry out the performance expected of a normal spare I/O unit.

BACKGROUND ART

An array-type magnetic disk controller has been in use as an I/O controller for supplying preventive maintenance information about a spare I/O unit, to be used in place of an I/O unit where an abnormality is found, to a host unit. An array-type magnetic disk controller comprises a host unit interface controller, a subordinate unit interface controller, a processor, and various registers. A plurality of data disk drives, one parity disk drive, and one spare disk drive are connected as subordinate units and are under synchronous rotation control.

An array-type magnetic disk controller checks for data abnormality by reading data and parity, parallel from each of a plurality of data disk drives and the parity disk drive. When no abnormality is found and a normal operation is confirmed, data is transferred to a host unit unmodified.

When any data abnormality is detected, an array-type magnetic disk drive restores correct data on the basis of data and parity which are read from a normal data disk drive, other than the one disk drive the defective data is read from, and a parity disk drive, and transfer it to the host unit.

If, for some reason, any abnormality including a read error or a hardware failure occurs more frequently than the specified times in one of the data disk drives acting as a current I/O unit, or in a parity disk drive, all the data written in the abnormal data disk drive or the abnormal parity disk drive is automatically and instantly recovered from the other normal data disk drives and a normal parity disk drive and restored in the spare disk drive. By using the spare disk drive as a current I/O unit, in place of the abnormal disk drive, continued operation is ensured and system down time is prevented.

However, it could happen, that the presence of a hard error or a read error in a spare disk drive itself cannot be readily detected by a host unit, and the spare disk drive itself is found to contain a hard error or a read error the first time the spare disk drive is used as an I/O unit in place of the abnormal disk drive, and cannot perform the function of a spare disk drive.

That is why a method has been in use, in an equipment comprising a main system consisting of a plurality of units, and a spare unit for backing up the units of the main system, wherein a spare unit is monitored by providing a spare unit with the same input signal as the one given to any unit of the main system, and comparing both signals output from the spare unit and the aforementioned unit of the main system (Japanese Laid-Open Patent Application 56-72359). However, this method of monitoring necessitates always operating the spare unit concurrently with the current unit in the main system. It is equivalent to having one more I/O unit to be controlled by an I/O controller, and results in increased load on the host unit.

Another method has been in use wherein abnormality of an I/O controller is regularly monitored according to a time table (Japanese Laid-Open Patent Application 62-212856). This does not, however, either monitor abnormality of a spare I/O unit or utilize a time interval not in use for an operation. Still other methods have been in use, including a method of monitoring, wherein an equipment, provided with dual central processing units (CPU), namely the current and spare CPUs, allows a test to be carried out under a condition similar to a normal operation by running a software in the spare CPU concurrently (Japanese Laid-Open Patent Application 2-93953), and a method of monitoring wherein a test is carried out at a regular interval on the spare CPU (Japanese Laid-Open Patent Application 62-90068). However, these methods of equipment monitoring having dual CPUs are not the ones for monitoring a spare CPU utilizing a time interval not in use for an operation. The present invention was developed in view of these considerations.

SUMMARY OF THE INVENTION

It is an object of the present invention is to provide an I/O controller designed for monitoring the status of a spare I/O unit and/or a current I/O unit.

It is another object of the present invention is to provide an I/O controller designed for monitoring the status of a spare I/O unit and/or a current I/O unit, at a time interval not in use for an operation when no command from a host unit is being processed.

In order to achieve the aforementioned objects, the I/O controller of the present invention consists of a subordinate unit interface controller connected to a plurality of I/O units and one spare I/O unit, a host unit interface controller which receives action commands issued from a host unit to the aforementioned I/O units or the spare I/O unit, a means of checking normality of the data in the I/O units by reading data and an error-detecting code concurrently from the I/O units, a controlling unit, a decision unit, and a preventive maintenance information storage register.

When the data in all the I/O units is found to be normal by the aforementioned checking unit, the aforementioned controlling unit selects the main I/O units only. When any of the I/O units is found to contain a data abnormality with the checking unit, the aforementioned controlling unit selects the other normal units and the aforementioned spare I/O unit, and controls the aforementioned I/O units or spare I/O unit based on the aforementioned command input via the host unit interface controller.

The aforementioned decision unit selects the aforementioned I/O unit or spare I/O unit via the aforementioned subordinate unit interface controller at a time interval not in use for an operation when the controlling unit is not processing the command input from the aforementioned host unit via the aforementioned host unit interface controller, and decides whether the selected I/O units or spare I/O unit operates normally. A preventive maintenance information storage register temporarily stores information about the abnormality when the decision unit gives a decision of abnormality.

The present invention makes it possible for a host unit to monitor a hard error and a read error in an I/O unit or a spare I/O unit as part of a normal operation. This allows repairing or exchanging any abnormal I/O unit during a normal operation, and putting a spare I/O unit into a normal operation without delay when any abnormality including a read error or a hardware failure occurs in a current I/O unit so that the spare I/O unit is used for the first time by the host unit.

The present invention uses a plurality of data disk drives and one parity disk drive as the aforementioned I/O units, uses one spare disk drive as the aforementioned spare I/O unit, comprises synchronous rotation controller that puts these disk drives under synchronous rotation controller, and comprises the aforementioned controlling unit, checking unit, decision unit, a subordinate unit interface controller, and a channel interface controller. By using the present invention, it is possible to detect abnormality in a spare disk drive using an array-type magnetic disk drive without producing increased load on the host unit because abnormality of a spare disk drive can be detected at a time interval not in use for an operation, when no command from a host unit is being processed.

The present invention also comprises a patrol timer register that counts a time interval not in use for an operation, and gives a decision about abnormality in a spare I/O unit or a spare I/O disk drive after the count of the timer register has reached a specified value. This results in an accurate counting of a time interval not in use for an operation.

Moreover, in the aforementioned array-type magnetic disk controller of the present invention, the spare disk drive is powered by a power supplying unit even when it is not in use, thus maintaining the spare I/O disk drive always ready, and allowing the decision on the spare disk drive.

BRIEF DESCRIPTION OF THE DRAWINGS

FIGS. 5A and 5B are flow charts illustrating a second embodiment of the present invention.

DESCRIPTION OF THE PREFERRED EMBODIMENTS

Figure 1:
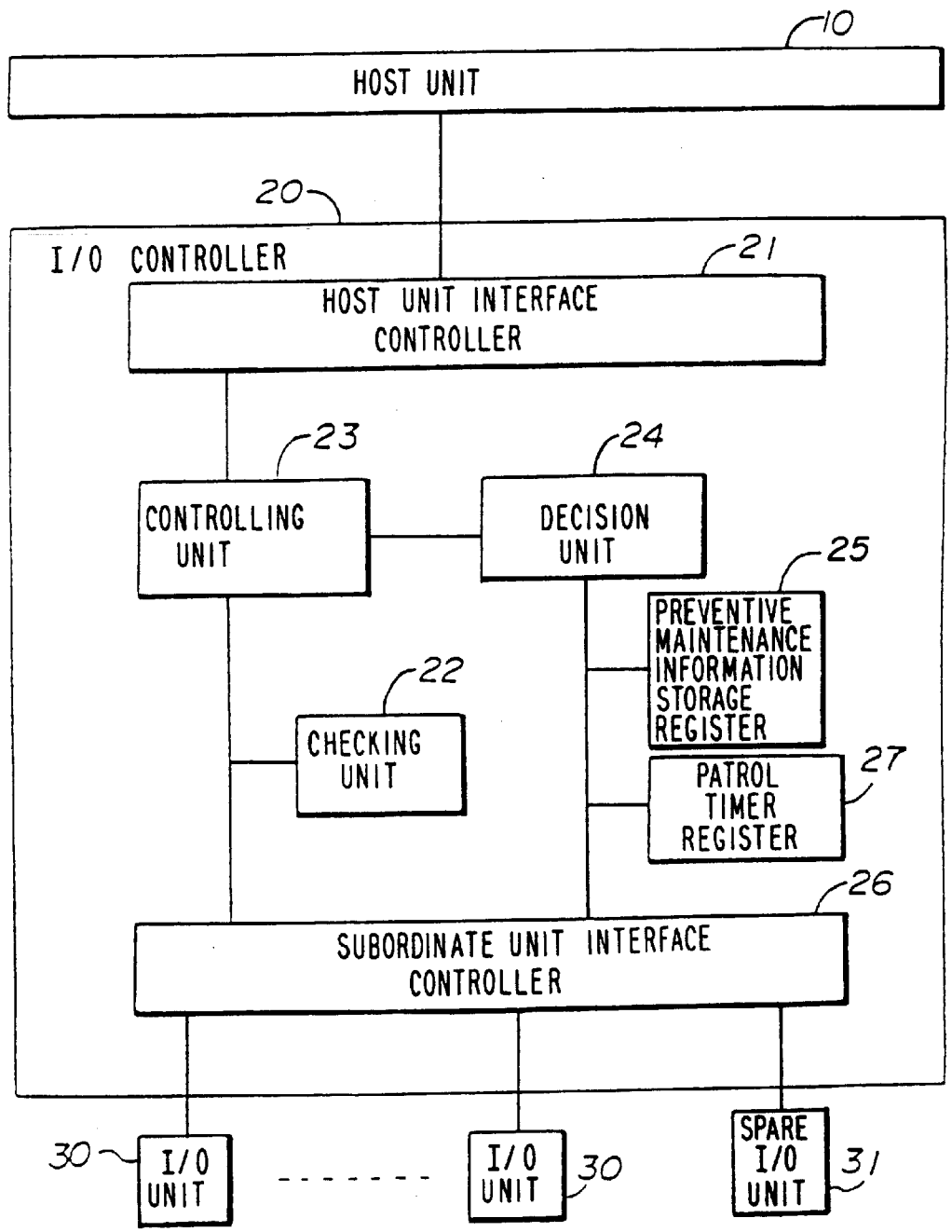
FIG. 1 is a block diagram illustrating a basic principle of the present invention.

In order to give a detailed description of the present invention, explanations will be given below in accordance with the figures attached. In FIG. 1, an I/O controller 20 comprises a host unit interface controller 21, a checking unit 22, a controlling unit 23, a decision unit 24, a preventive maintenance information storage register 25, a subordinate unit interface controller 26, and a patrol timer register 27. The host unit interface controller 21 receives commands issued from a host unit 10. The subordinate unit interface controller 26 is connected to a plurality of I/O units and one spare I/O unit 31. The checking means 22 reads data and error-detecting code concurrently from the I/O units 30, and performs error detection by using the data and error detection codes thus read, and checks for normality of data in the I/O units 30.

The controlling unit 23 selects the I/O units 30, when the result of the checking performed by the checking unit 22 shows that all the data read from the I/O units are normal, and controls the operation of the I/O controller 30 according to the command from the host unit. The spare I/O unit 31 is not used in this case.

On the other hand, when the result of the checking performed by the checking unit 22 shows that data read from one of the plurality of I/O units are found to contain abnormality more frequently than the specified times, the subordinate unit interface controller 26 restores all the data written in I/O units where an abnormality was found, from the data and error-detecting code read from the normal I/O units other than the I/O units where an abnormality was found, and writes the restored data into the spare I/O unit 31. Accordingly, the spare I/O unit is used as the current I/O unit in place of the I/O unit where an abnormality was found.

The decision unit 24 selects I/O units or the spare I/O unit via the subordinate unit interface controller 26, at a time interval not in use for an operation when the controlling unit 23 is not processing commands input from the host unit 10 via the host unit interface controller 21, and decides whether the selected I/O units 30 or the spare I/O unit 31 operates normally.

When the decision unit 24 gives a decision of abnormality, the information about that abnormality is stored in the preventive maintenance information storage register, in order to submit it to the host unit as preventive maintenance information. The time interval not in use for an operation at which the decision unit 24 should give a decision is determined from the count of the patrol timer register 27.

The aforementioned decision unit 24 gives decision of abnormality when the signals sent from the spare I/O unit 31 indicates a hard error when a write operation of data or a seek operation is completed. The decision unit 24 also gives a decision of abnormality when the means reads the data in the spare I/O unit 31 and the data thus read is found to contain a read error.

With the use of an I/O controller 20 with such a configuration, abnormality in the spare I/O unit 31 can be detected even when the spare I/O unit 31 is not in use, since a time interval not in use for an operation is used. Moreover, since preventive maintenance information is submitted to the host unit from the preventive maintenance information storage register 25, when the spare I/O 31 unit is found to contain abnormality, the host unit 10 is capable of identifying a hard error or a read error in the spare I/O unit 31 itself, based on that preventive maintenance information.

Moreover, with the use of the I/O controller 20, abnormality not only in the spare I/O unit 31 but also in the I/O units 30 can be detected. In the latter case, the decision means 24 gives a decision of abnormality when a hard error signal is input from the I/O units 30, after carrying out a seek operation in the I/O units 31.

Figure 2:
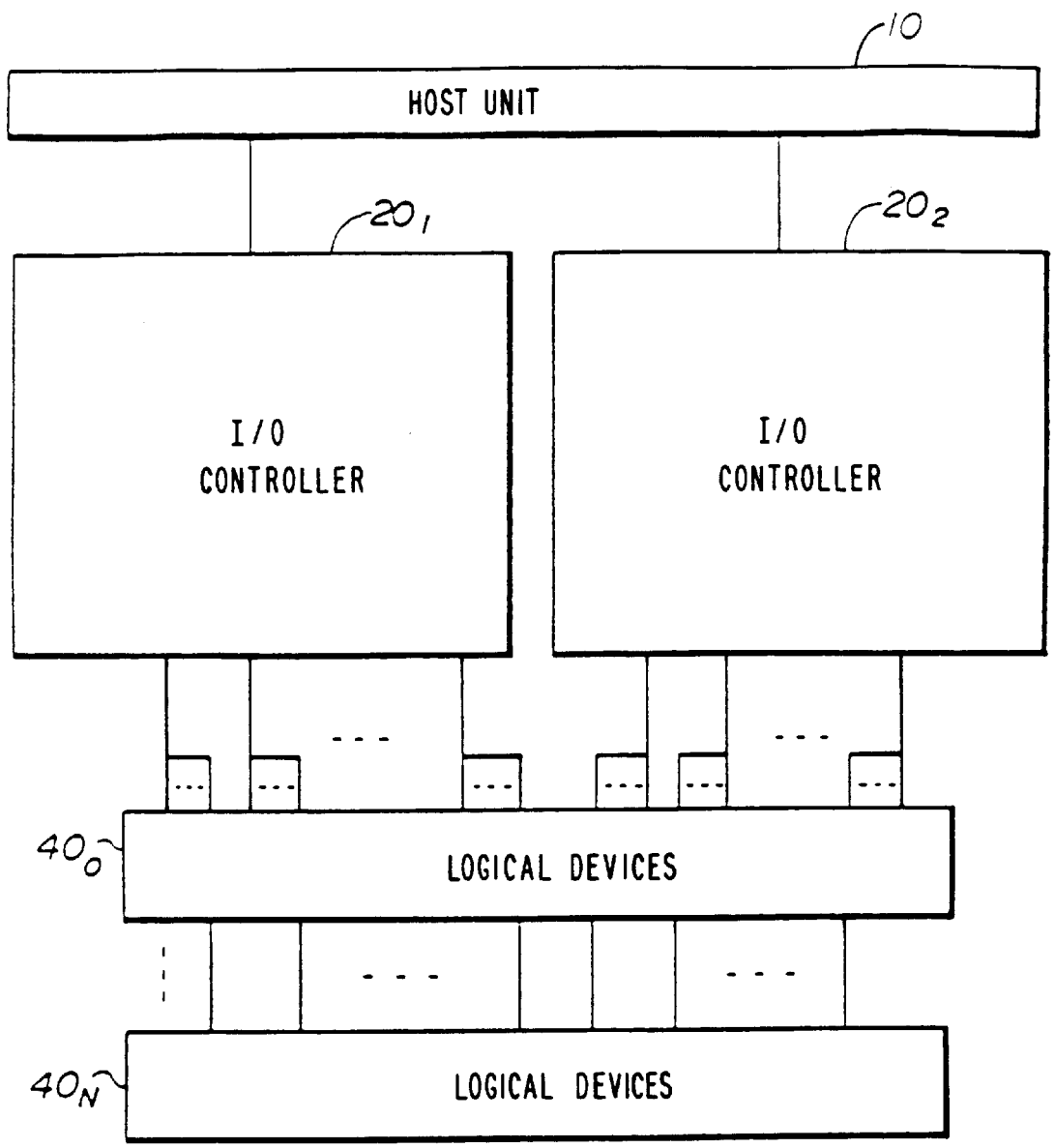
FIG. 2 is a block diagram of two I/O controllers sharing a host unit and a plurality of logical devices.

It is recommended to provide two sets of this I/O controller 20 shown as $20_1$, $20_2$ in FIG. 2, allow the two sets to share a host unit 10 and a plurality of logical devices $40_0$–$40_N$. Each of the logical devices $40_0$–$40_N$ comprises a plurality of I/O units and one spare I/O unit 31.

With such a configuration, it is possible for each of the I/O controllers $20_1$ and $20_2$ to select and control different logical devices at a given moment, based on the command from the host unit 10.

Figure 3:
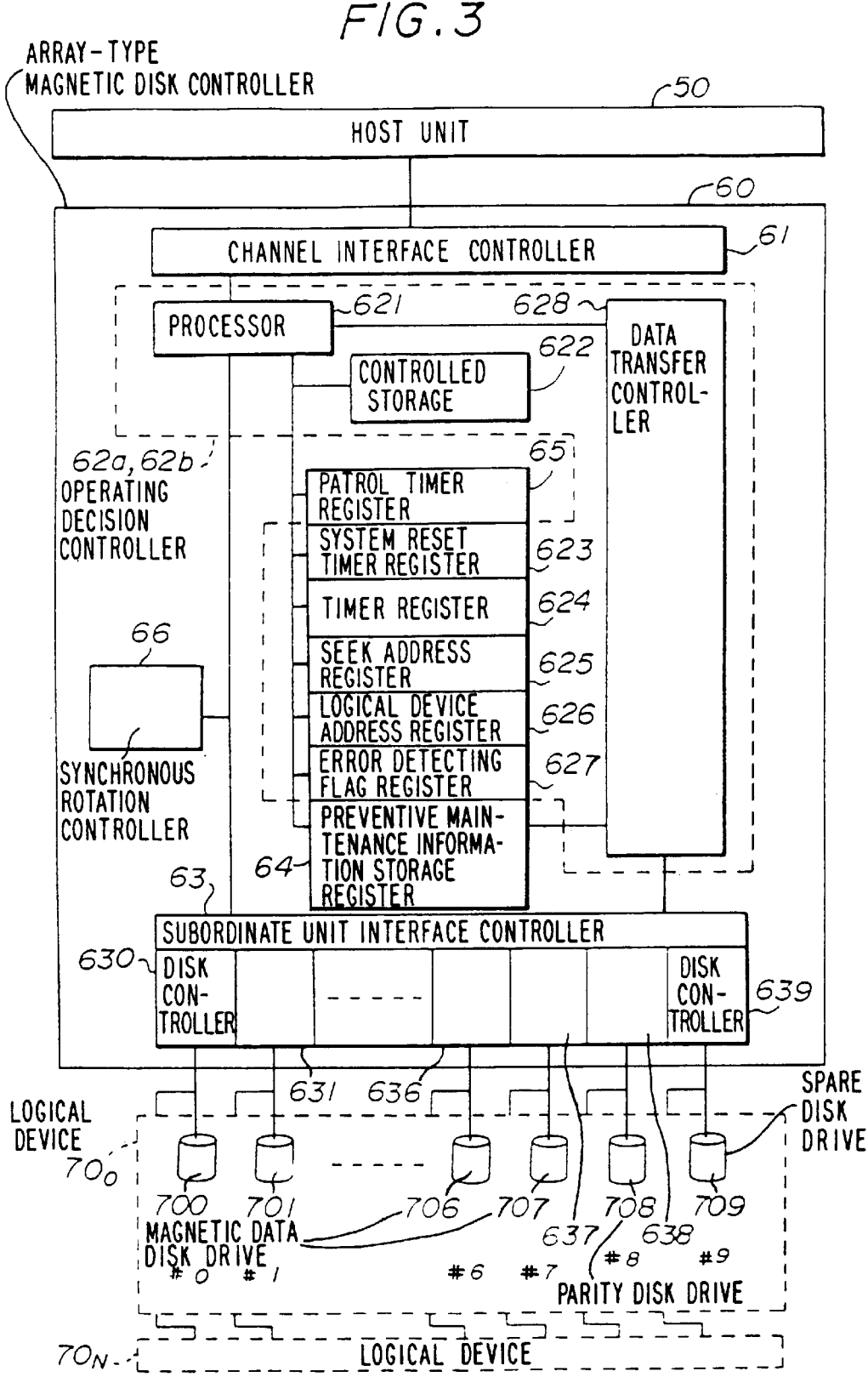
FIG. 3 is a block diagram of an embodiment of the I/O controllers of the present invention.

The FIG. 3 embodiment will be described. In FIG. 3, an array-type magnetic disk controller 60 corresponds to the aforementioned I/O controller 20. The array-type magnetic disk controller 60 comprises a channel interface controller 61 that corresponds to the host unit interface controller 21, an operation controller 62a, a decision controller 62b, a subordinate unit interface controller 63, which corresponds to the subordinate unit interface controller 26, a preventive maintenance information storage register 64, a patrol timer register 65, and a synchronous rotation controller 66.

The operation controller 62a is a circuit constituting the aforementioned checking unit 22, the controlling unit 23, whereas the interpretation controller 62b is a circuit constituting the decision means 24. Both comprise a processor 621, a controlled storage 622, a system reset timer register 623, a timer register 624 for monitoring the operating time, a seek address register 625, a logical device address register 626, an error detecting flag register 627, and a data transfer controller 628.

The processor 621 controls the whole array-type magnetic disk controller, which is of a microprogrammable type. The controlled storage 622 stores the instruction code for the processor 621 and is used as a table for controlling a firmware.

The data transfer controller 628 controls the data transfer between the channel interface controller 61 and the subordinate unit interface controller 63. It also generates the parity of the transferred data and transfers it to the subordinate unit interface controller 653.

The subordinate unit interface controller 63 comprises disk controllers #0–#9 shown as 630–639. The channel interface controller 61 comprises control registers and performs bidirectional data communication with the host unit 50. The host unit 50 is comprised of CPUs (central processing units). The synchronous rotation controller 66 puts under synchronous control magnetic disks in the ten magnetic disk drives belonging to logical devices $70_0$–$70_N$ described later.

Each of the disk controllers 630–639 is connected to N+1 sets of logical devices $70_0$–$70_N$. The logical devices $70_0$–$70_N$ are all of the same configuration, and consist of ten magnetic disk drives 700–709. Of these ten, the magnetic drives 700–707 are data disk drives with data already written in the magnetic disks, and are configured in such a way that data can be written and read at will.

A magnetic disk drive 708 is a parity disk drive where the parity bit of the data written in the data disk drives 700–707 is written in a read-write enabled magnetic disk (hereinafter called a parity disk). A magnetic disk drive 709 is a spare disk drive and neither data nor parity is written initially in a read-write enabled magnetic disk (hereinafter called a spare disk). Of the logical devices $70_0$–$70_N$, only one logical device is controlled by the array-type magnetic disk controller 60 at a given moment.

The array-type magnetic disk controllers 60 shown in FIG. 3 are provided as a pair and in parallel as shown in FIG. 2, and are connected in such a way that they share the host unit 50 and are capable of controlling, independently of each other, the logical devices $70_0$–$70_N$ respectively.

The array-type magnetic controller 60, in this configuration, is characterized in that a higher speed of data transfer is attained compared with the configuration where one magnetic disk drive is used, because data defined by the command from the host unit 50 are written in and read from the data disk drives 700–707, in a block of 8 bytes simultaneously, while at the same time the parity of those data are written in and read from the parity disk drive 708.

Moreover, the controller, in this configuration, is characterized in that it has a great reliability, because when any of the aforementioned 9 disk drives 700–708 is found to contain abnormality including a read error or a hardware failure while a command from the host unit 50 is being processed, it automatically restores, in the magnetic disk subsystem, the content of the disk drive where the abnormality was found, from the data of the remaining 8 normal disk drives, and writes the restored data in the spare disk drive 709.

For example, given that the data written in the 8 magnetic disks are $D_0$–$D_7$, that the parity written in the parity disk in the one parity disk drive 708 is $P_0$, and that an abnormality occurred in the magnetic disk in data disk drive 702, then the unreadable data D2 is restored from the other data $D_0$, $D_1$, $D_3$–$D_7$ and the parity $P_0$, which were readable. If an abnormality occurs more frequently than specified times in the data disk drive 702, all the data written in the data disk drive 702 is written in the spare disk drive by restoring it automatically from the other 8 normal disk drives in the magnetic disk subsystem. The spare disk drive 709 will be used in place of the data disk drive 702.

A description will be given below in each embodiment of an operation which may be carried out at the time no command from the host unit 50 is being processed, in the I/O subsystem employing an array-type magnetic disk controller 60 like the one described above.

Figure 4:
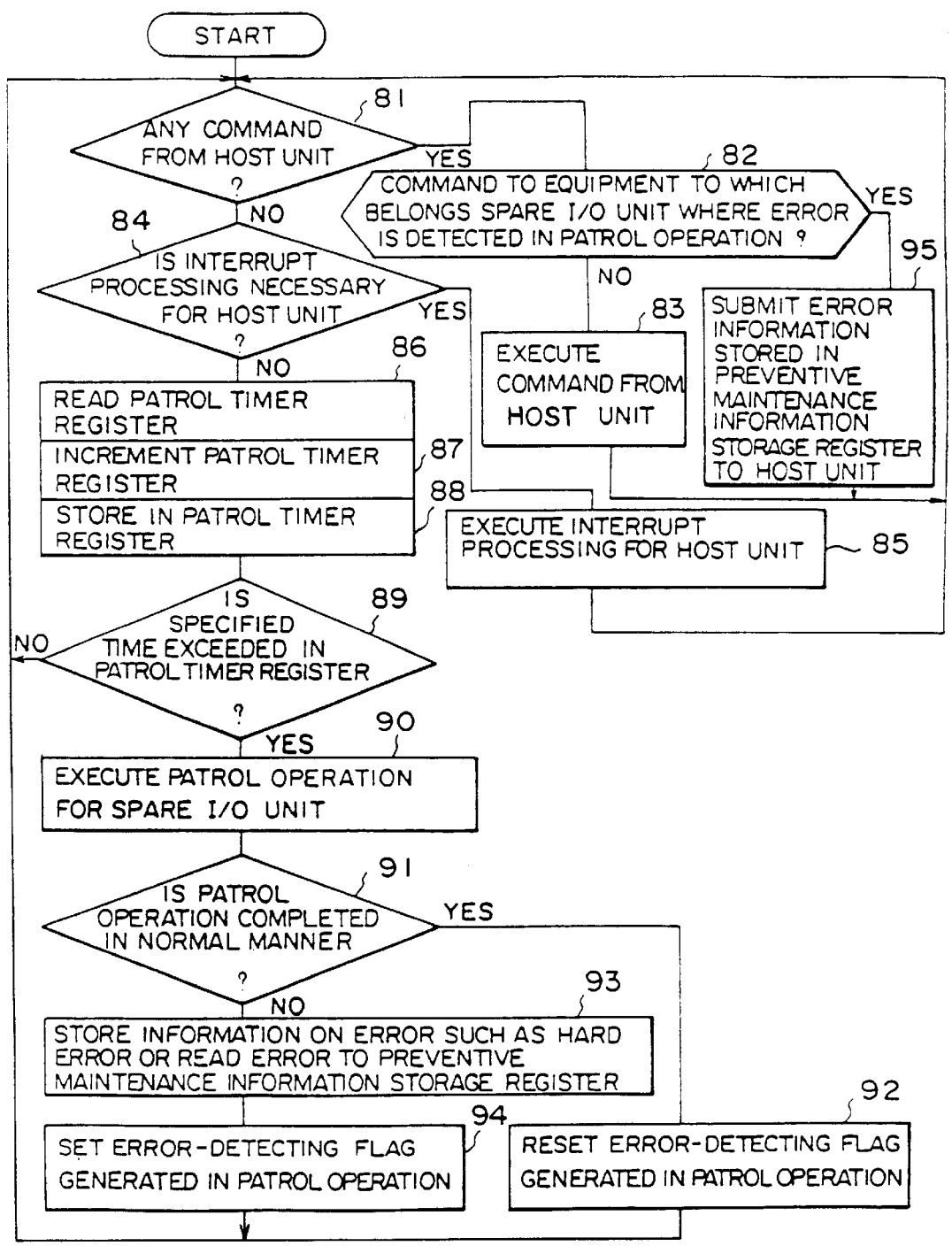
FIG. 4 is a flow chart illustrating an operation of the first embodiment of the present invention.

First, a description of an operation in the first embodiment will be given using FIG. 4. This embodiment does not utilize the system reset timer register 623, the timer register 624 for monitoring the operating time, the seek address register 625, the logical device address register 626, and the error-detecting flag register 627, and performs only the patrol operation on the spare disk drive 709. Referring to FIG. 4, the processor 621 determines whether any command from the host unit 50 exists (step 81). If the host unit 50 issues a command such as a read/write command to one logical device via the array-type magnetic disk controller 60, the array-type magnetic disk controller 60 performs a read/write operation of data and parity on the 9 disk drives from 700–to 708 simultaneously via the disk controllers 630–639.

More specifically, the processor checks for the presence of any command from the host unit 50 each time it processes one command, as shown in FIG. 4 (step 81). When the processor detects a command, it determines whether the command is the one given to the logical device where an error is detected during a patrol operation (step 82). Since the decision "no" is arrived at in a normal operation, the processor processes the command from the host unit 50 (step 83) and returns to step 81.

Assuming that the data contains 8 bytes, data consisting of 1 byte each is output to the data disk drives 700–707 in a parallel manner via the disk controllers 630–637 at the time of writing. The parity generated from these 8 bytes of data in the data transfer controller 628 is output to the parity disk drive 708 via the disk controller 638. At the time of reading, data and parity read in the disk drives 700–708 is input to the data transfer controller via the disk controllers 630–638.

On the other hand, when it was determined that there is no command from the host unit 50, the processor then determines whether it is necessary to perform an interrupt processing with the host unit 50 (step 84). For example, it determines whether a command chain involves such interrupt processing with the host unit as the one based on the device-end notification from devices after a seek is completed.

When an interrupt processing is found necessary, the interrupt processing is performed with the host unit 50 (step 85). When an interrupt processing is unnecessary, the patrol timer register 65 is read (step 86), is incremented (step 87), and a storage (step 88) is carried out, in a sequential manner. It is then determined whether the count of the patrol timer register 65 has exceeded the specified value (that is, has exceeded the value corresponding to the specified time) following the aforementioned increment (step 89). When the count is not found to exceed the specified value in step 89, the process returns to step 81 again.

When the count is found to exceed the specified value, the process then goes to step 90, where a patrol operation is carried out on the spare disk drive 709 (step 90). More specifically, the processor 621 generates data having specific pre-defined pattern and inputs the data to the disk controller 639 via the data transfer controller 628. Error-detecting codes are then generated according to the data having a specific pattern, and attached to the aforementioned data having a specific pattern. These data having a specific pattern and error-detecting code are written on one track of the spare disk drive 639 belonging to the logical device specified in the logical device address register 626.

The spare disk drive 709 submits a hard error signal to the disk controller 639 when the aforementioned patrol operation (read/write operation) was not successful. And the data and error-detecting code read and output from the spare disk in a read operation, is input to the data transfer controller 628 via the disk controller 639. The processor 621 determines whether the patrol operation was successful, depending on the presence or absence of the aforementioned hard error signal input and a read error in the aforementioned read data (step 91). When an error is not found, the processor determines that the operation was successful, and resets the error-detecting flag that is generated in a patrol operation and resides in the controlled storage 622 (step 92).

On the other hand, when it is determined in step 91 that there is an error, the processor 621 collects detailed information on the error status such as the one regarding a hard error obtained after an unsuccessful seek operation, or a read error, then stores it in the preventive maintenance information storage register (step 93), and sets the error-detecting flag generated in the patrol operation and which is stored in the controlled storage 622 (step 94).

When step 92 or step 94 completes, the process returns to step 81.

Thus, the read and write operation of the aforementioned data having a specific pattern and error-detecting code, and the error detection, continue to be carried out in such a way as shown above (step 90), on one track of the spare disk in the spare disk drive 709 belonging to each logical device, at a specific interval determined by the patrol timer register 65 (steps 86–89), utilizing a time interval not in use for an operation when there are no commands from the host unit 50.

When the aforementioned read and write operation on the first track of the logical device $70_N$ completes, a read and write operation of the data having a specific pattern and error-detecting code, and an error detection, are then carried out on next track of the spare disk of the spare disk drive 709 belonging to the logical device $70_0$. The same operation is repeated thereafter.

When a command is issued from the host unit 50 to the logical device to which the spare disk where an error was detected by the patrol operation belongs (step 81, 82), the processor 621 reads the preventive maintenance information stored in the preventive maintenance information storage register 64, and submits it to the host unit 50 via the interface controller 61, and provides the unit with information regarding the error in the spare disk drive (step 95), before returning to step 81.

Thus, when any hard error or read error is found in the spare disk drive 709 itself, it is possible to make timely repairs and exchanges as they are required due to a hard error or a read error in the spare disk drive 709 itself, for example, based on the preventive maintenance information submitted from the array-type magnetic disk controller 60. This makes it possible to use the spare disk drive 709 without delay when a need of replacing a disk drive, in which an abnormality occurs, with the spare disk drive 709 arises.

A description will be given below of an operation in a second embodiment of the present invention, using the flow chart FIGS. 5A and 5B. This embodiment is arranged in such a way that not only the patrol operation on the spare disk drive 709 but also the patrol operation on the data disk drives 700–707, which are the current I/O units, and the parity disk drive 708, is carried out.

Referring to FIG. 5A, when the array-type magnetic disk controller 60 is powered, a power-on sequence is carried out in step 101 in FIG. 5A. In this power-on sequence, the aforementioned registers 64, 65, 623–627 are initialized. At the same time as the controller is powered up, the logical devices $70_0$–$70_N$ are powered up, and the spare disk drive 709, as well as the other disk drives 700–708, is powered up.

The processor 621 then determines whether there is any command from the host unit 50 (step 102). When the host unit 50, including the central processing unit (CPU), issues a command such as a data read or write command to one of the logical devices, via the array-type magnetic disk controller 60, the array-type magnetic disk controller 60 carries out the read and write operation or data and parity on the 9 magnetic disks of the disk drives 700–708 simultaneously, via the disk controllers 630–639.

More specifically, the processor 621 checks to see whether there is any command from the host unit 50 (step 102) each time it processes one command as shown in FIG. 5A. When the processor detects a command it then determines whether the command is the one issued to the logical device where an error was detected during the patrol operation (step 10). Since the decision "no" is arrived at in a normal operation, the processor processes the command from the host unit 50 (step 104) and initializes the timer register 624 for monitoring the operating time (step 105), before returning to step 102.

When it is determined in step 102 that there are no commands from the host unit 50, the processor determines whether such interrupt processings as CONTROL END (CU END) or DEVICE END are necessary (step 106) for the host unit 50.

When an interrupt processing is found necessary, the interrupt processing is performed for the host unit 50 (step 107). When an interrupt processing is unnecessary, the patrol timer register 65 is incremented (step 106), and the system reset timer register 623 is incremented (step 109), in a sequential manner. It is then determined whether the count of the system reset timer register 623 has exceeded the specified value corresponding to ten minutes (step 110), and whether the count of the patrol timer register 65 has exceeded the specified value (that is, whether it has exceeded the value corresponding to one second, the specified time) (step 111), in a sequential manner. When the counts are not found to exceed the specified values in steps 110 and 111, the process returns to step 102 again. As mentioned later, one second as specified in the aforementioned patrol timer register 65 is a selection cycle of the logical device. One second has been defined empirically for the purpose of not causing any trouble in processing commands from the host unit 50.

On the other hand, when the counts are not found to exceed the specified value either in step 110 or in 111, the process goes on to step 112. It is then determined whether a patrol operation is inhibited due to the setting of hardware switches provided on a maintenance panel or due to the command from the host unit 50. When a patrol operation is inhibited, the process returns to step 102. In normal cases, where a patrol operation is not inhibited, the mode in which CONTROL BUSY (Cu Busy) is returned for the command from the host unit 50, is set (step 113), the content of the logical device address register 626 for executing a patrol operation, is read (step 114), and a relevant logical device is selected (step 115).

Then it is determined whether the relevant logical device is available (step 116). This is done because even when the relevant logical device is not powered, the selection of a logical device in step 115 is carried out, and the processor 621 needs to examine the status of the relevant logical device, thus checking the availability of the relevant logical device. When the relevant logical device is available, it is determined whether the relevant logical device is busy because it is used from another system (step 117). As shown in FIG. 2, when two or more array-type magnetic disk controllers 60 are used concurrently, the logical device cannot be used if it is already used by an array-type magnetic disk controller in another system.

When the logical device is not available (step 116) or when the logical device is used from another system (step 117), the selection of the logical device is cancelled (step 118), and the logical device address register 626 for the patrol operation is incremented and stored (step 119). That is, the selection of the logical device is abandoned, and the selection of another logical device is carried out. The patrol timer register 65 and the timer register 624 for monitoring the operating time are respectively initialized (step 120), then the process returns to step 102.

Figure 5B:
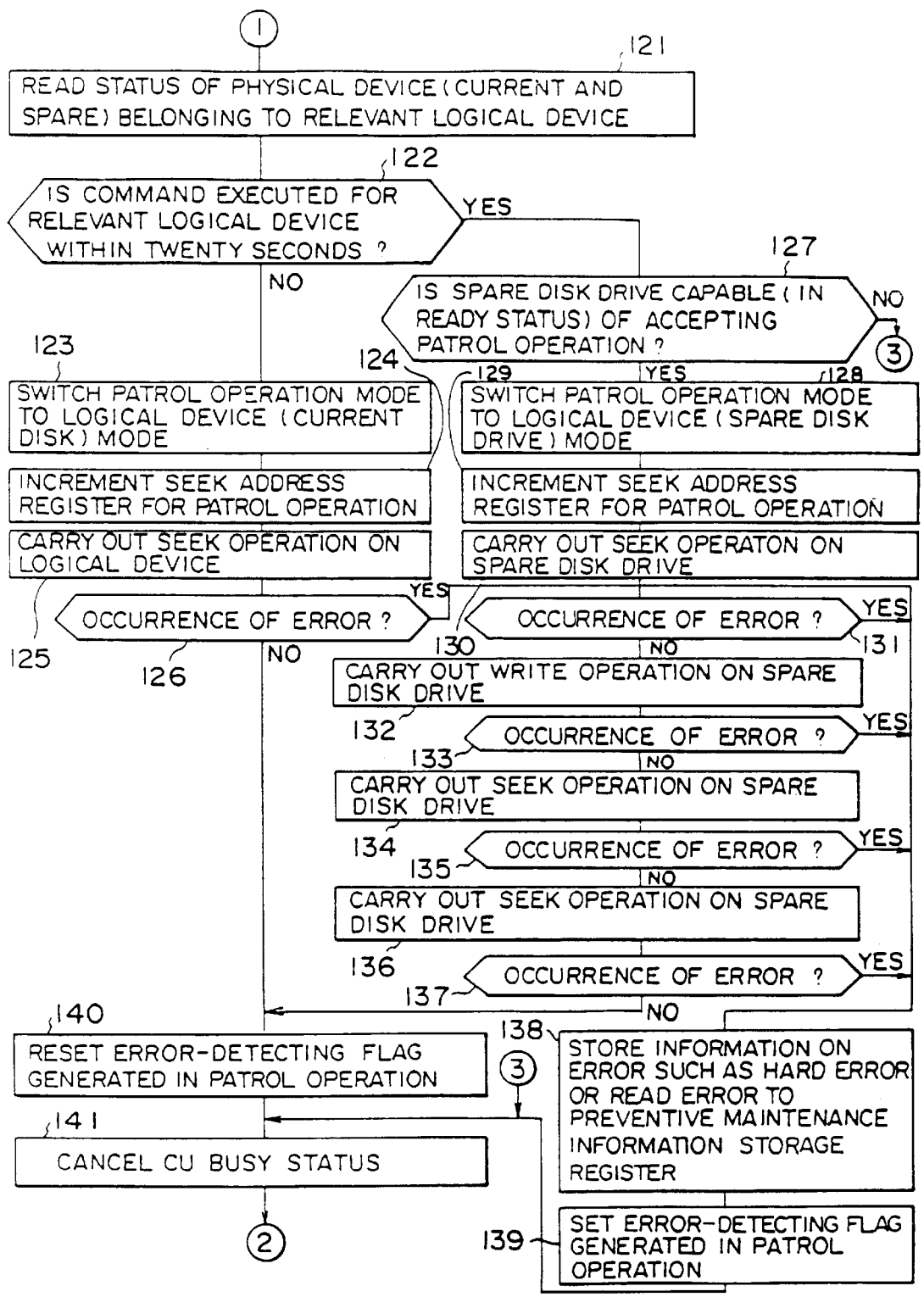

When the logical device is available and is not used from another system (step 116, 117), the process goes on to step 121 of FIG. 5B, and the status of the physical device (namely, the data disk drives 70–707, the parity disk drive 708, and the spare disk drive 709) in the logical device, is read (step 121).

It is then determined whether a command is executed on the logical device within twenty seconds (step 122). The passage of twenty seconds is determined depending on whether the count of the timer register 624 for monitoring the operating time has reached the value (count) corresponding to twenty seconds. The setting of twenty seconds is an empirical one and other values can serve as well.

When no commands are executed within twenty seconds, the patrol operation mode is switched to the logical device mode (step 123). This logical device mode is the mode in which the current data disk drives 700–707 and the parity disk drive 708 are used. When this mode is activated a seek address register 625 for the patrol operation is incremented (step 124) and, a seek operation is carried out where each head of the aforementioned logical devices (namely, disk drives 700–708) is moved a specified distance from the current position, to be returned to their original position (step 125). This seek operation is a patrol seek operation, and is performed to make sure that the head is free of dust, in view of the fact that allowing the head to stay at the same position causes dust to attach to the head, thus affecting a read and write operation adversely.

When the aforementioned patrol seek operation is not completed in a normal manner, a hard error signal is transmitted from the disk drive that failed, to the corresponding disk controller. The processor 621 determines the presence of an error, depending on whether this hard error signal is input or not (step 126). When an error is detected, step 138 described later is executed. When no error is detected, step 140 described later is executed.

When it is determined in step 122 that a command was executed within twenty seconds, the patrol operation mode is switched to the physical device mode (step 128) after a check is made as to whether the spare disk drive 709 is operable (in standby status) (step 127). This physical device mode is the mode in which only the spare disk drive 709 is used. When this mode is activated, the seek address register 625 for the patrol operation is incremented (step 129), and a seek operation is carried out on the spare disk drive 709 (step 130).

This seek operation is a seek operation which is done in advance at the time of a write operation. It is needed in the spare disk drive 709, which is included in the present embodiment, because a seek operation, where a head is moved a specified distance in advance of a read or write operation, is called for from a structural point of view. This seek operation also protects the head from dust, as does the aforementioned patrol seek operation. When this seek operation is not completed in a normal manner, the spare disk drive 709 transmits a hard error signal to the disk controller 639. When this hard error signal is input, step 131 confirms an occurrence of error. When the hard error signal is not input, a normal operation is confirmed.

When a normal operation is confirmed, the aforementioned write operation of data having a specific pattern, and of the error-detecting code, is carried out on the spare disk drive 709 (step 132).

The spare disk drive 639 transmits a hard error signal to the disk controller 639, as in the seek operation, when the aforementioned write operation was not carried out in a normal manner, so that the processor 621 can check for an error, based on whether this hard error signal is input (step 133). When no error is found, the processor carries out a seek operation, which precedes a read operation, on the spare disk drive 134 (step 134), determines whether an error occurred from presence or absence of a hard error signal (step 135), after moving the head to the start of a track on which the aforementioned error-detecting code and data are written, and when no error is found, carries out the read operation (step 136) and regenerates the aforementioned data and error-detecting code.

When any hard error exists at the time this read operation is completed, a hard error signal is provided to the disk controller 639. The data and error-detecting code read and output from the spare disk drive in the read operation are input into the data transfer controller 628 via the disk controller 639. The processor tries to determine whether any hard error signal is input or there is a read error (step 137). When no error is found, the processor 621 determines that the operation was completed in a normal manner, and resets the error-detecting flag of the error-detecting flag register 627 (step 140).

When an error is found to occur in any of steps 126, 131, 133, 135, or 137, the processor 621 collects detailed information concerning the status of such errors as a hard error where a seek is not completed in a normal manner, or a read error, stores the information in the preventive maintenance information storage register 64 (step 138), and sets the error-detecting flag of the error-detecting flag register 627 (step 139).

When the process in steps 139 or 140 is completed, or when the spare disk drive 709 is found incapable of accepting a patrol operation in step 127, Cu Busy status is cancelled (step 141), the selection of the current logical device is cancelled in steps 118 120 of FIG. 4A, after which the logical device address register 626 for the patrol operation is incremented so that the next logical device is specified, the patrol timer register 65 and the timer register 120 for monitoring the operating time are initialized respectively, and the process returns to step 102.

Thereafter, the write and read operation of the aforementioned data having a specific pattern and error-detecting code, and an error detection continue to be carried out (steps 129–137), on one track of the spare disk in the spared disk drive 709 belonging to each logical device, at an interval (one second, in normal cases) specified by the patrol timer register 65 (step 111), at a time interval not in use for an operation when there is no command from the host unit 50 (step 102).

When the above-mentioned read and write operation on the first track of the spare disk drive 709 belonging to the logical device $70_N$ is completed, such operations as a read and write operation of the aforementioned data having a specific pattern and of error-detecting code, and an error detection are carried out on the next track on the spare disk of the spare disk drive 709 belonging to the logical device $70_0$. Thereafter, operations like those above are repeated.

The track of the spare disk on which the read and write operation of data are carried out when the logical device is selected after one second, is not the track contiguous with the previous track, but the track a specified number of tracks away. In other words, the recordable side of the spare disk is divided into a plurality of zones, and an increment number in step 129 is preset in the seek address register 625 so that data is written on a representative track of each zone. This makes it possible to give a decision about the normality of the spare disk in a short time.

When a command is issued from the host unit 50 to the logical device to which the spare disk found to contain an error in a patrol operation (step 102, 103) belongs, the processor reads the preventive maintenance information stored in the preventive maintenance information storage register 64, transmits it to the host unit 50 via the channel interface controller 61, submits the error information about the spare disk drive (step 142), resets the error-detecting flag set in the error-detecting flag register 627 generated in the patrol operation (step 143), and returns to step 102.

Thus, this embodiment ensures that not only when a hard error or a read error is found in the spare disk drive 709 itself, but also when a hard error is found in the current data disk drives 700–707 or in the parity disk drive, it is possible to make timely repairs and exchanges as they are required due to a hard error or a read error, for example, based on the preventive maintenance information submitted from the array-type magnetic disk controller 60.

The present invention is not limited to the embodiments above. The patrol timer register 65 and the register 64 for storing preventive maintenance information need not be hardware. The alternatives are that the processor 621 executes the timer function with firmware, or stores the preventive maintenance information in the controlled storage 622.

POSSIBLE APPLICATION IN INDUSTRY

As has been described, the I/O controller in the present invention is connected to a plurality of I/O units and one spare I/O unit, and is suitable for high-speed data transfer in that the controller controls a plurality of I/O units concurrently and performs a read and write operation of the data from the host unit, in a parallel manner. It also has a high reliability in that the preventive maintenance information about the spare I/O unit, to be used in place of one I/O unit where an abnormality occurred, is submitted to the host unit, and is suitable for application in a computer system in which high reliability is required.

What is claimed is:

1. An array storage system coupled to a host unit and comprising:
    logical devices, each logical device comprising:
        a spare storage device, and
        data storage devices;
    array-type disk controllers, provided in a pair and in parallel and coupled to the logical devices and to the host unit, each of said array-type controllers simultaneously and independently controlling a respective one of said logical devices to execute a command issued by the host unit and to determine whether each of the spare storage device and the data storage devices provided in the respective one of said logical devices is one of normal and abnormal, each of said array-type disk controllers controlling said data storage devices provided in the respective one of said logical devices if the each of said data storage devices provided in the respective one of said logical devices is normal, and controlling the spare storage device and remaining of said normal data storage devices provided in the respective one of said logical devices if one of the data storage devices provided in the respective one of the logical devices is abnormal; and
    power supply means for supplying power to each of said data storage devices and said spare storage device and for maintaining each of said data storage devices and said spare storage device provided in each of said logical devices in ready status, wherein the spare storage device stores data previously stored in the one of the data storage devices being abnormal, and reconstructed by a reconstruction process, and wherein data is not stored in the spare storage device if said data storage devices are normal.

2. The array storage system as recited in claim 1, wherein data defined by a command issued by the host unit are written in a read from the data storage devices in a block of 8 bytes simultaneously.

3. The array storage system as recited in claim 1, wherein the each logical device further comprises a parity disk drive, the power supply means maintains the parity disk drive in ready status, and parity is written in and read from the parity disk drive at the same time the data are written in and read from the data storage devices.

4. The array storage system as recited in claim 1, wherein each of the array-type controllers executes a patrol operation to determine whether each of the data storage devices and the spare disk device in each of the logical devices is one of normal and abnormal.

5. An array storage system coupled to a host unit issuing an operation command, said array storage system comprising:
   storage devices comprising:
      a spare storage device, and
      data storage devices;
   an operation controller controlling a read operation on said storage devices, said operation controller controlling said data storage devices if said data storage devices are normal and without one of a hard error, a read error, and both the hard error and the read error, and controlling the spare storage device and remaining of said data storage devices which are normal if one of a hard error, a read error, and both are found in one of the storage devices, said operation controller comprising:
      a subordinate unit I/O controller connected to said storage devices,
      a host unit interface controller, operatively connected to said host unit and said subordinate unit I/O controller, receiving said operation command issued from said host unit and forwarding said operation command to said storage devices,
      checking means for checking a normality of data in said storage devices, based on a signal obtained by reading data and the error detection code concurrently from said storage devices,
      controlling means for controlling at least one of said storage devices based on said operation command input from said host interface controller via said subordinate unit I/O controller, said controlling means controlling said data storage devices only, if a normality of data is found in all said data storage devices by said checking means and controlling remaining normal data storage devices and said spare storage device if an abnormality is found in any of said data storage devices by said checking means, and controlling, via said subordinate unit I/O controller, one of said selected data storage devices and said spare storage device, on the basis of said operation command input from said host unit via said host unit interface controller,
      decision means for deciding whether at least one of said data storage devices and said spare storage device operate normally if said controlling means is not processing said operation command input from said host unit via said host unit interface controller, and
      an information storage register temporarily storing information regarding an abnormality if an abnormality of said data storage devices and said spare storage device is found by said decision means; and
   power supply means for supplying power to each of said data storage devices, and said spare storage device, and for maintaining each of said storage devices in ready status.

6. The array storage system as claimed in claim 5, wherein said spare storage device outputs a hard error signal if data is not normally written in said spare storage device, and
   wherein said decision means outputs a decision about an abnormality based on said hard error signal from said spare storage device.

7. The array storage system as claimed in claim 6, wherein said spare storage device outputs the read error signal if data written during a write operation on said spare storage device is not normally read during the read operation in said spare storage device, and
   wherein said decision means outputs a decision about an abnormality based on the read error signal from said spare storage device.

8. The array storage system as claimed in claim 6, wherein said spare storage device outputs a hard error signal if a seek operation is not carried out normally, and
   wherein said decision means outputs a decision about an abnormality based on the read error signal from said spare storage device.

9. The array storage system as claimed in claim 6, wherein said spare storage device outputs a hard error signal if a seek operation is not carried out normally, and
   wherein said decision means outputs a decision about an abnormality based on the hard error signal from said spare storage device.

10. The array storage system as claimed in claim 6, wherein if a command is not executed within a specified time after an execution of a command from a host unit, said decision controller outputs a decision about abnormality for one selected storage device of the storage devices, based on one of a presence and an absence of the hard error, after carrying out a patrol seek operation wherein each head of data disk drives of said storage devices and said at least one of said plurality of data disk drives of said storage devices storing parity data, which comprise said one selected storage device, is moved a specified distance.

11. The array storage system as claimed in claim 6, further comprising:
   means for determining that said controlling means is not processing a command input from said host unit via said channel interface controller; and
   a patrol timer register for counting a predetermined time interval in accordance with said determining means,
   wherein said decision means outputs a decision about normality in one of said selected storage device and said spare storage device after said patrol timer register counts up the predetermined time interval.

12. The array storage system as claimed in claim 6, wherein said array storage system comprises more than one said host unit interface controller, said checking means, said information storage register, said controlling means, said decision means, and said subordinate unit interface controller, which are placed in a shared connection with a plurality of storage devices.

13. The array storage system as claimed in claim 5, wherein said decision means allows said spare storage device to carry out a write operation of data if a first seek operation is performed and completed in a normal manner, and
   wherein said decision means outputs a decision about an abnormality based on the hard error signal from said storage devices.

14. The array storage system as claimed in claim 5, wherein the storage devices are disk drives.

15. The array storage system as claimed in claim 14, wherein the disk drives are magnetic disk drives.

16. An array storage system comprising:
   storage devices comprising:

a spare storage device, and
data storage devices;
an operation controller controlling a read operation on said storage devices, said operation controller controlling said data storage devices if said data storage devices are normal and without one of a hard error, a read error, and both the hard error and the read error, and controlling the spare storage device and other of said data storage devices which are normal if one of a hard error, a read error, and both are found in one of the storage devices; and
means for carrying out a seek operation if said operation controller is not processing a command input from an external unit, coupled to the array storage system, to said operation controller, wherein the spare storage device stores data previously stored in the one of the data storage devices experiencing one of a hard error, a read error, and both, and reconstructed by a reconstruction process, and wherein data are not stored in the spare storage device if said data storage devices are normal and without error, wherein the spare storage device is separate from the data storage devices.

17. The array storage system as claimed in claim 16 wherein the storage devices are disk drives.

18. The array storage system as claimed in claim 17, wherein the disk drives are magnetic disk drives.

19. An array storage system comprising:
storage devices comprising:
a spare storage device, and
data storage devices;
an operation controller controlling a read operation on said storage devices, said operation controller controlling said data storage devices and said first storage device if said data storage devices and said first storage device are normal and without one of a hard error, a read error, and both the hard error and the read error, and controlling the first storage device, the spare storage device and other of said data storage devices which are normal if one of a hard error, a read error, and both are found in one of the storage devices, said operation controller comprising:
a subordinate unit I/O controller connected to said storage devices,
an external unit interface controller, operatively connected to said external unit and said subordinate unit I/O controller, receiving said operation command issued from said external unit and forwarding said operation command to said storage devices,
checking means for checking a normality of data in said storage devices, based on a signal obtained by reading data and the error detection code concurrently from said storage devices,
controlling means for controlling at least one of said storage devices based on said operation command input from said external interface controller via said subordinate unit I/O controller, said controlling means controlling said data storage devices only, if a normality of data is found in all said data storage devices by said checking means and controlling remaining normal data storage devices and said spare storage device if an abnormality is found in any of said data storage devices by said checking means, and controlling, via said subordinate unit I/O controller, one of said selected data storage devices and said spare storage device, on the basis of said operation command input from said external unit via said external unit interface controller,
decision means for deciding whether at least one of said data storage devices and said spare storage device operate normally if said controlling means is not processing said operation command input from said external unit via said external unit interface controller, and
an information storage register temporarily storing information regarding an abnormality if an abnormality of said data storage devices and said spare storage device is found by said decision means; and
means for carrying out a seek operation if said operation controller is not processing a command input from an external unit, coupled to the array storage system, to said operation controller.

20. The array storage system as claimed in claim 19, wherein said spare storage device outputs the read error signal if data written during a write operation on said spare storage device is not normally read during the read operation in said spare storage device, and
wherein said decision means outputs a decision about an abnormality based on the read error signal from said spare storage device.

21. The array storage system as claimed in claim 19, wherein said spare storage device outputs a hard error signal if the seek operation is not carried out normally, and
wherein said decision means outputs a decision about an abnormality based on the read error signal from said spare storage device.

22. The array storage system as claimed in claim 19, wherein said spare storage device outputs a hard error signal if the seek operation is not carried out normally, and
wherein said decision means outputs a decision about an abnormality based on the hard error signal from said spare storage device.

23. The array storage system as claimed in claim 19, wherein said decision means allows said spare storage device to carry out a write operation of data if a first seek operation is performed and completed in a normal manner, and
wherein said decision means outputs a decision about an abnormality based on the hard error signal from said storage devices.

24. The array storage system as claimed in claim 19, wherein if a command is not executed within a specified time after an execution of a command from the external unit, said decision controller outputs a decision about abnormality for one selected storage device of the storage devices, based on one of a presence and an absence of the hard error, after carrying out a patrol seek operation wherein each head of data disk drives of said storage devices is moved a specified distance.

25. The array storage system as claimed in claim 19, further comprising:
means for determining that said controlling means is not processing a command input from said external unit via said external unit interface controller; and
a patrol timer register for counting a predetermined time interval in accordance with said determining means,
wherein said decision means outputs a decision about normality in one of said selected storage device and said spare storage device after said patrol timer register counts up the predetermined time interval.

26. The array storage system as claimed in claim 19, wherein said array storage system comprises more than one said external unit interface controller, said checking means, said information storage register, said controlling means, said decision means, and said subordinate unit interface controller, which are placed in a shared connection with a plurality of storage devices.

27. An array storage apparatus coupled to a host unit issuing a command, said array storage apparatus comprising:
   a logical storage device comprising physical storage devices, said physical storage devices comprising:
      a spare physical storage device, and
      physical data storage devices; and
      an array controller, coupled to the logical storage device, and comprising an information storage register storing information about an abnormality of said physical data storage devices belonging to said logical storage device, said array controller controlling a read operation on said logical storage device and transmitting the information stored in said information storage register to the host unit, said command issued by the host unit indicating the read operation on said logical device where the information is stored in said register, wherein the spare storage device stores data previously stored in one of the physical data storage devices experiencing the abnormality, and reconstructed by a reconstruction process, and wherein data are not stored in the spare storage device if said physical data storage devices are not experiencing the abnormality, wherein the spare physical storage device is separate from the physical data storage devices.

28. The array storage apparatus as claimed in claim 27, wherein the storage devices are magnetic storage devices.

29. An array storage apparatus coupled to a host unit issuing a command, said array storage apparatus comprising:
   a logical storage device comprising physical storage devices, said physical storage devices comprising:
      a spare physical storage device, and
      physical data storage devices; and
      an array controller, coupled to the logical storage device and comprising an information storage register storing information about an abnormality of said physical storage devices belonging to said logical storage device, said array controller controlling a read operation on said logical storage device and transmitting the information stored in said information storage register to the host unit, said command issued by the host unit indicating the read operation on said logical device where the information is stored in said register, said array controller further comprising:
         a subordinate unit I/O controller connected to said storage devices,
         a host unit interface controller, operatively connected to said host unit and said subordinate unit I/O controller, receiving said operation command issued from said host unit and forwarding said operation command to said storage devices,
         checking means for checking a normality of data in said storage devices, based on a signal obtained by reading data and the error detection code concurrently from said storage devices,
         controlling means for controlling at least one of said storage devices based on said operation command input from said host interface controller via said subordinate unit I/O controller, said controlling means controlling said data storage devices only, if a normality of data is found in all said data storage devices by said checking means and controlling remaining normal data storage devices and said spare storage device if an abnormality as found in any of said data storage devices by said checking means, and controlling, via said subordinate unit I/O controller, one of said selected data storage devices and said spare storage device, on the basis of said operation command input from said host unit via said host unit interface controller,
         decision means for deciding whether at least one of said data storage devices and said spare storage device operate normally if said controlling means is not processing said operation command input from said host unit via said host unit interface controller, and
         an information storage register temporarily storing information regarding an abnormality if an abnormality of said data storage devices and said spare storage device is found by said decision means.

30. The array storage apparatus as claimed in claim 29, wherein said spare storage device outputs a hard error signal if data is not normally written in said spare storage device, and
   wherein said decision means outputs a decision about an abnormality based on said hard error signal from said spare storage device.

31. The array storage apparatus as claimed in claim 30, wherein said spare storage device outputs the read error signal if data written during a write operation on said spare storage device is not normally read during the read operation in said spare storage device, and
   wherein said decision means outputs a decision about an abnormality based on the read error signal from said spare storage device.

32. The array storage apparatus as claimed in claim 30, wherein said spare storage device outputs a hard error signal if a seek operation is not carried out normally, and
   wherein said decision means outputs a decision about an abnormality based on the read error signal from said spare storage device.

33. The array storage apparatus as claimed in claim 30, wherein the storage devices are magnetic storage devices.

34. The array storage apparatus as claimed in claim 29, wherein said spare storage device outputs a hard error signal if a seek operation is not carried out normally, and
   wherein said decision means outputs a decision about an abnormality based on the hard error signal from said spare storage device.

35. The array storage apparatus as claimed in claim 29, wherein said decision means allows said spare storage device to carry out a write operation of data if a first seek operation is performed and completed in a normal manner, and
   wherein said decision means outputs a decision about an abnormality based on the hard error signal from said storage devices.

36. The array storage system as claimed in claim 35, wherein if a command is not executed within a specified time after an execution of a command from a host unit, said decision controller outputs a decision about abnormality for one selected storage device of the storage devices, based on one of a presence and an absence of the hard error, after carrying out a patrol seek operation wherein each head of data disk drives of said storage devices is moved a specified distance.

37. The array storage apparatus as claimed in claim 36, wherein the storage devices are magnetic storage devices.

38. The array storage apparatus as claimed in claim 29, wherein the storage devices are magnetic storage devices.

39. An array storage apparatus coupled to a host unit issuing a command, said array controller comprising:
- logical storage devices, each of the logical storage devices comprising:
  - physical storage devices comprising:
    - a spare physical storage device being a spare storage device, and
    - physical data storage devices; and
- an array controller, coupled to the logical storage devices and comprising an information storage register storing information about an abnormality of said physical storage devices belonging to each of said logical storage devices, said array controller controlling a read operation on said logical storage devices independently and transmitting the information storage in said information storage register to the host unit, said command issued by the host unit indicating the read operation to one of said logical devices where the information has been stored in said register, wherein the spare storage device stores data previously stored in one of the physical data storage devices experiencing the abnormality, and reconstructed by a reconstruction process, and wherein data are not stored in the spare storage device if said physical data storage devices are not experiencing the abnormality, wherein said spare physical storage device is separate from said physical data storage devices.

40. An array storage apparatus coupled to a host unit issuing a command, said array controller comprising:
- logical storage devices, each of the logical storage devices comprising:
  - physical storage devices comprising:
    - a spare physical storage device, and
    - physical data storage devices; and
  - array controllers, providing in a pair and in parallel, and coupled to the physical storage devices, controlling a read operation on said logical storage devices independently, said array controllers comprising:
    - an information storage register storing information about an abnormality of said physical storage devices belonging to each of said logical storage devices, wherein said array controllers transmitting the information storage in said information storage register to the host unit, said command issued by the host unit indicating the read operation to one of said logical devices where the information has been stored in said register,
    - a subordinate unit I/O controller connected to said storage devices,
    - a host unit interface controller, operatively connected to said host unit and said subordinate unit I/O controller, receiving said operation command issued from said host unit and forwarding said operation command to said storage devices,
    - checking means for checking a normality of data in said storage devices, based on a signal obtained by reading data and the error detection code concurrently from said storage devices,
    - controlling means for controlling at least one of said storage devices based on said operation command input from said host interface controller via said subordinate unit I/O controller, said controlling means controlling said data storage devices only, if a normality of data is found in all said data storage devices by said checking means and controlling remaining normal data storage devices and said spare storage device if an abnormality is found in any of said data storage devices by said checking means, and controlling, via said subordinate unit I/O controller, one of said selected data storage devices and said spare storage device, on the basis of said operation command input from said host unit via said host unit interface controller,
    - decision means for deciding whether at least one of said data storage devices and said spare storage device operate normally if said controlling means is not processing said operation command input from said host unit via said host unit interface controller, and
    - an information storage register temporarily storing information regarding an abnormality if an abnormality of said data storage devices and said spare storage device is found by said decision means.

41. The array storage apparatus as claimed in claim 40, wherein said spare storage device outputs a hard error signal if data is not normally written in said spare storage device, and
- wherein said decision means outputs a decision about an abnormality based on said hard error signal from said spare storage device.

42. The array storage apparatus as claimed in claim 41, wherein said spare storage device outputs the read error signal if data written during a write operation on said spare storage device is not normally read during the read operation in said spare storage device, and
- wherein said decision means outputs a decision about an abnormality based on the read error signal from said spare storage device.

43. The array storage apparatus as claimed in claim 41, wherein said spare storage device outputs a hard error signal if a seek operation is not carried out normally, and
- wherein said decision means outputs a decision about an abnormality based on the read error signal from said spare storage device.

44. The array storage apparatus as claimed in claim 41, wherein the storage devices are magnetic storage devices.

45. The array storage apparatus as claimed in claim 40, wherein said spare storage device outputs a hard error signal if a seek operation is not carried out normally, and
- wherein said decision means outputs a decision about an abnormality based on the hard error signal from said spare storage device.

46. The array storage apparatus as claimed in claim 40, wherein said decision means allows said spare storage device to carry out a write operation of data if a first seek operation is performed and completed in a normal manner, and
- wherein said decision means outputs a decision about an abnormality based on the hard error signal from said storage devices.

47. The array storage system as claimed in claim 46, wherein if a command is not executed within a specified time after an execution of a command from a host unit, said decision controller outputs a decision about abnormality for one selected storage device of the storage devices, based on one of a presence and an absence of the hard error, after carrying out a patrol seek operation wherein each head of data disk drives of said storage devices is moved a specified distance.

48. The array storage apparatus as claimed in claim 40, wherein the storage devices are magnetic storage devices.

49. An array storage apparatus coupled to a host unit issuing a command and accessible to a logical storage device comprising physical storage devices, a first one of the physical storage devices storing an error correction code, a spare one of the physical storage devices being a spare storage device, and each of remaining of the physical storage devices storing data, said array storage apparatus comprising:

an operation controller controlling a read operation on said storage devices, said operation controller controlling said data storage devices and said first one of the physical storage devices if said remaining of the storage devices and said first one of the storage devices are normal and do not contain one of a hard error, a read error, and both of the hard error and the read error, and controlling other of said remaining storage devices, the first one of the storage devices, and said spare of the storage devices if one of said remaining storage devices contains one of a hard error, a read error, and both the hard error and the read error; and means for instructing a seek operation to said physical storage devices if said operation controller is not processing a command input from an external unit to said operation controller, wherein the spare storage device stores data previously stored in the one of the remaining data storage devices experiencing one of a hard error, a read error, and both, and reconstructed by a reconstruction process, and wherein data are not stored in the spare storage device if said remaining data storage devices are normal and without error, wherein said spare one of said physical storage devices being separate from said first one of said physical storage devices and separate from each of the remaining of the physical storage devices.

50. The array storage apparatus as claimed in claim 49, wherein the storage devices are magnetic storage devices.

51. An array storage apparatus coupled to a host unit issuing a command and accessible to a logical storage device comprising physical storage devices, a first one of the physical storage devices storing an error correction code, a spare one of the physical storage devices being a spare storage device, and each of remaining of the physical storage devices storing data, said array storage apparatus comprising:

an operation controller controlling a read operation on said storage devices, said operation controller controlling said data storage devices and said first one of the physical storage devices if said remaining of the storage devices and said first one of the storage devices are normal and do not contain one of a hard error, a read error, and both of the hard error and the read error, and controlling other of said remaining storage devices, the first one of the storage devices, and said spare of the storage devices if one of said remaining storage devices contains one of a hard error, a read error, and both the hard error and the read error, said operation controller comprising:

a subordinate unit I/O controller connected to said storage devices, a host unit interface controller, operatively connected to said host unit and said subordinate unit I/O controller, receiving said operation command issued from said host unit and forwarding said operation command to said storage devices, checking means for checking a normality of data in said storage devices, based on a signal obtained by reading data and the error detection code concurrently from said storage devices, controlling means for controlling at least one of said storage devices based on said operation command input from said host interface controller via said subordinate unit I/o controller, said controlling means controlling said data storage devices only, if a normality of data is found in all said data storage devices by said checking means and controlling remaining normal data storage devices and said spare storage device if an abnormality is found in any of said data storage devices by said checking means, and controlling, via said subordinate unit I/O controller, one of said selected data storage devices and said spare storage device, on the basis of said operation command input from said host unit via said host unit interface controller, decision means for deciding whether at least one of said data storage devices and said spare storage device operate normally if said controlling means is not processing said operation command input from said host unit via said host unit interface controller, and an information storage register temporarily storing information regarding an abnormality if an abnormality of said data storage devices and said spare storage device is found by said decision means; and means for instructing a seek operation to said physical storage devices if said operation controller is not processing a command input from an external unit to said operation controller.

52. The array storage apparatus as claimed in claim 51, wherein said spare storage device outputs a hard error signal if data is not normally written in said spare storage device, and wherein said decision means outputs a decision about an abnormality based on said hard error signal from said spare storage device.

53. The array storage apparatus as claimed in claim 52, wherein said spare storage device outputs the read error signal if data written during a write operation on said spare storage device is not normally read during the read operation in said spare storage device, and wherein said decision means outputs a decision about an abnormality based on the read error signal from said spare storage device.

54. The array storage apparatus as claimed in claim 52, wherein said spare storage device outputs a hard error signal if a seek operation is not carried out normally, and wherein said decision means outputs a decision about an abnormality based on the read error signal from said spare storage device.

55. The array storage apparatus as claimed in claim 52, wherein the storage devices are magnetic storage devices.

56. The array storage apparatus as claimed in claim 51, wherein said spare storage device outputs a hard error signal if a seek operation is not carried out normally, and wherein said decision means outputs a decision about an abnormality based on the hard error signal from said spare storage device.

57. The array storage apparatus as claimed in claim 51, wherein said decision means allows said spare storage device to carry out a write operation of data if a first seek operation is performed and completed in a normal manner, and wherein said decision means outputs a decision about an abnormality based on the hard error signal from said storage devices.

58. The array storage system as claimed in claim 57, wherein if a command is not executed within a specified time after an execution of a command from a host unit, said decision controller outputs a decision about abnormality for one selected storage device of the storage devices, based on one of a presence and an absence of the hard error, after carrying out a patrol seek operation wherein each head of data disk drives of said storage devices, which comprise said one selected storage device, is moved a specified distance.

59. The array storage apparatus as claimed in claim 51, wherein the storage devices are magnetic storage devices.

60. An array storage apparatus coupled to a host unit issuing a command and accessible to a logical storage device comprising physical storage devices, a first one of the physical storage devices storing an error correction code, a spare one of the physical storage devices being a spare storage device, said array storage apparatus comprising:

an array controller coupled to the logical storage device and comprising an information storage register storing information about an abnormality of said physical storage devices belonging to said logical storage device, said array controller controlling a read operation on said logical storage device, said array controller transmitting the information stored in said information storage register to the host unit, said command issued by the host unit indicating the operation to said logical device where the information has been stored in said register, wherein the spare storage device stores data previously stored in one of the remaining physical data storage devices experiencing the abnormality, and reconstructed by a reconstruction process, and wherein data are not stored in the spare storage device if said remaining physical data storage devices are not experiencing the abnormality, wherein said spare one of said physical storage devices being separate from said first one of said physical storage devices and separate from each of remaining of the physical storage devices.

61. The array storage apparatus as claimed in claim 60, wherein the storage devices are magnetic storage devices.

62. An array storage apparatus coupled to a host unit issuing a command and accessible to a logical storage device comprising physical storage devices, a first one of the physical storage devices storing an error correction code, a spare one of the physical storage devices being a spare storage device, said array storage apparatus comprising:

an array controller coupled to the logical storage device and comprising an information storage register storing information about an abnormality of said physical storage devices belonging to said logical storage device, said array controller controlling a read operation on said logical storage device, said array controller transmitting the information stored in said information storage register to the host unit, said command issued by the host unit indicating the operation to said logical device where the information has been stored in said register, wherein the spare storage device stores data previously stored in one of the remaining physical data storage devices experiencing the abnormality, and reconstructed by a reconstruction process, and wherein data are not stored in the spare storage device if said remaining physical data storage devices are not experiencing the abnormality, wherein said array controller further comprises:

a subordinate unit I/O controller connected to said storage devices, a host unit interface controller, operatively connected to said host unit and said subordinate unit I/O controller, receiving said operation command issued from said host unit and forwarding said operation command to said storage devices, checking means for checking a normality of data in said storage devices, based on a signal obtained by reading data and the error detection code concurrently from said storage devices, controlling means for controlling at least one of said storage devices based on said operation command input from said host interface controller via said subordinate unit I/O controller, said controlling means controlling said data storage devices only, if a normality of data is found in all said data storage devices by said checking means and controlling remaining normal data storage devices and said spare storage device if an abnormality is found in any of said data storage devices by said checking means, and controlling, via said subordinate unit I/O controller, one of said selected data storage devices and said spare storage device, on the basis of said operation command input from said host unit via said host unit interface controller, and decision means for deciding whether at least one of said data storage devices and said spare storage device operate normally if said controlling means is not processing said operation command input from said host unit via said host unit interface controller, said information storage register temporarily storing information regarding an abnormality if an abnormality of said data storage devices and said spare storage device is found by said decision means.

63. The array storage apparatus as claimed in claim 62, wherein said spare storage device outputs a hard error signal if data is not normally written in said spare storage device, and wherein said decision means outputs a decision about an abnormality based on said hard error signal from said spare storage device.

64. The array storage apparatus as claimed in claim 63, wherein said spare storage device outputs the read error signal if data written during a write operation on said spare storage device is not normally read during the read operation in said spare storage device, and wherein said decision means outputs a decision about an abnormality based on the read error signal from said spare storage device.

65. The array storage apparatus as claimed in claim 63, wherein said spare storage device outputs a hard error signal if a seek operation is not carried out normally, and wherein said decision means outputs a decision about an abnormality based on the read error signal from said spare storage device.

66. The array storage apparatus as claimed in claim 63, wherein the storage devices are magnetic storage devices.

67. The array storage apparatus as claimed in claim 62, wherein said spare storage device outputs a hard error signal if a seek operation is not carried out normally, and wherein said decision means outputs a decision about an abnormality based on the hard error signal from said spare storage device.

68. The array storage apparatus as claimed in claim 62, wherein said decision means allows said spare storage device to carry out a write operation of data if a first seek operation is performed and completed in a normal manner, and wherein said decision means outputs a decision about an abnormality based on the hard error signal from said storage devices.

69. The array storage system as claimed in claim 68, wherein if a command is not executed within a specified time after an execution of a command from a host unit, said decision controller outputs a decision about abnormality for one selected storage device of the storage devices, based on one of a presence and an absence of the hard error, after carrying out a patrol seek operation wherein each head of data disk drives of said storage devices is moved a specified distance.

70. The array storage apparatus as claimed in claim 62, wherein the storage devices are magnetic storage devices.

* * * * *